US011478830B2

(12) United States Patent
Zeng et al.

(10) Patent No.: US 11,478,830 B2
(45) Date of Patent: Oct. 25, 2022

(54) CLEANING DEVICE

(71) Applicant: TENON (BEIJING) EQUIPMENT CO., LTD, Beijing (CN)

(72) Inventors: Haodong Zeng, Beijing (CN); Yuanhong Zhu, Beijing (CN)

(73) Assignee: TENON (BEIJING) EQUIPMENT CO., LTD, Beijing (CN)

(*) Notice: Subject to any disclaimer, the term of this patent is extended or adjusted under 35 U.S.C. 154(b) by 368 days.

(21) Appl. No.: 16/916,561

(22) Filed: Jun. 30, 2020

(65) Prior Publication Data
US 2021/0323037 A1  Oct. 21, 2021

(30) Foreign Application Priority Data
Apr. 16, 2020 (CN) .......................... 202010299976.9

(51) Int. Cl.
*B08B 13/00* (2006.01)
*B08B 11/04* (2006.01)
*B08B 1/00* (2006.01)
*B08B 11/02* (2006.01)

(52) U.S. Cl.
CPC .............. *B08B 11/04* (2013.01); *B08B 1/002* (2013.01); *B08B 11/02* (2013.01); *B08B 13/00* (2013.01)

(58) Field of Classification Search
None
See application file for complete search history.

(56) References Cited

U.S. PATENT DOCUMENTS 4,352,221 A * 10/1982 Revells .................... A46B 9/02
  15/179
6,301,930 B1 * 10/2001 Warner ............... C03C 23/0075
  65/168

* cited by examiner

*Primary Examiner* — Eric W Golightly
(74) *Attorney, Agent, or Firm* — Westbridge IP LLC

(57) ABSTRACT

A cleaning device for cleaning a single-curved glass includes: a box body, a transmission mechanism, a cleaning mechanism and a drying mechanism. The box body includes two openings. Each of the two openings is disposed on one side of the box body. The single-curved glass enters the box body through one opening and exits the box body through the other opening. The transmission mechanism includes a first drive group and two second drive groups. The first drive group is slidably disposed on the box body. The second drive groups are disposed on two sides of the first drive group on the box body. The second drive groups are to deliver the single-curved glass in the box body. The cleaning mechanism is slidably disposed on the box body to clean the single-curved glass. The drying mechanism is slidably disposed on the box body to dry the single-curved glass.

20 Claims, 12 Drawing Sheets

CLEANING DEVICE

CROSS-REFERENCE TO RELATED APPLICATIONS

The present application claims priority of Chinese patent application CN202010299976.9 filed on Apr. 16, 2020, the entire contents of which are incorporated herein by reference.

TECHNICAL FIELD

The present disclosure relates to the field of cleaning devices, in particular to a cleaning device for cleaning a single-curved glass.

BACKGROUND

With the continuous improvements on automation of glass processing, more attention has been paid on how to clean and dry single-curved glasses. At present, single-curved glasses are mainly cleaned by hand. Therefore, the cleaning process is time-consuming and labor-consuming. Both the efficiency and the result of the cleaning process are poor. In addition, it is quite difficult to clean a single-curved glass with a large surface by hand.

SUMMARY

In view of the foregoing, the present disclosure provides a cleaning device for cleaning a single-curved glass. With this device, the problems of time and labor waste, low efficiency, poor cleaning effect and difficulties in cleaning a single-curved glass with a large surface by hand can be solved.

The cleaning device according to some examples of the present disclosure may include: a box body, a transmission mechanism, a cleaning mechanism and a drying mechanism.

According to some examples of the present disclosure, the box body comprises two openings on two side of the box body; wherein, the single-curved glass enters the box body through one opening and exits the box body through the other opening; the transmission mechanism comprises a first drive group and two second drive groups; wherein, the first drive group is slidably disposed on the box body; the second drive groups are disposed on the box body and on two sides of the first drive group; the second drive groups are to deliver the single-curved glass in the box body; the cleaning mechanism is slidably disposed on the box body to clean the single-curved glass; and the drying mechanism is slidably disposed on the box body and to dry the single-curved glass As can be seen from the above, the first drive group is slidably disposed on the box body, the two second drive groups are disposed on two sides of the first drive group on the box body. Through the adjustment of the position of the first drive group, single-curved glasses with different radius of curvature can be conveyed into and out from the box body. During this procedure, the single-curved glass can be cleaned by the cleaning mechanism and dried by the drying mechanism. Further, the cleaning device can not only replace manual work but also clean and dry the single-curved glass more rapidly, therefore, the efficiency of the cleaning device is very high.

In addition, the cleaning device is simple in structure. Therefore, the cost of the cleaning device is low. Moreover, it has no limitation on the sizes of the single curved glass to be cleaned, therefore, it can be widely used in actual situations.

BRIEF DESCRIPTION OF DRAWINGS

In order to illustrate the examples of the present disclosure more clearly, reference will now be made to the accompanying drawings, which are incorporated in and constitute a part of this specification.

DETAILED DESCRIPTION OF THE EMBODIMENTS

To further clarify the objects, aspects and advantages of the present application, a more particular description of the application will be rendered by reference to specific examples thereof which are illustrated in the appended drawings.

It should be noted that all expressions using "first" and "second" in this disclosure are to distinguish two different entities or two non-identical parameters with a same name. It can be seen that the term "first" and "second" is only used for the convenience of statement. They should not be interpreted as restrictions to embodiment. All expressions using "comprise/comprises/comprising", "include/includes/including" and as such in this disclosure are to express that the element before such expression comprises the elements and their equivalents after such expression, and can also comprise other elements. All expressions using "connect/connects/connecting" and as such in this disclosure refer not only to physical or mechanical connections but also electrical connections, no matter a connection is direct or indirect. All expressions using "up", "down", "left" and "right" in this disclosure are to express relative locations of two objects. When the location of an object change, the relative location of this object in view of another object may also change accordingly.

First, some terms used in this disclosure are introduced.

A single-curved glass is a cylindrical curved glass with only one radius of curvature.

As stated above, the single-curved glasses are mainly cleaned by hand now. The cleaning process is time-consuming and labor-consuming. Therefore, both the efficiency and the result of the cleaning are poor. In addition, it is quite difficult to clean a single-curved glass with a large surface by hand, thus the requirements on cleaning single-curved glasses cannot be well satisfied.

In order to solve the above technical problems, examples of the present disclosure provide a cleaning device for cleaning a single-curve glass.

Figure 1:
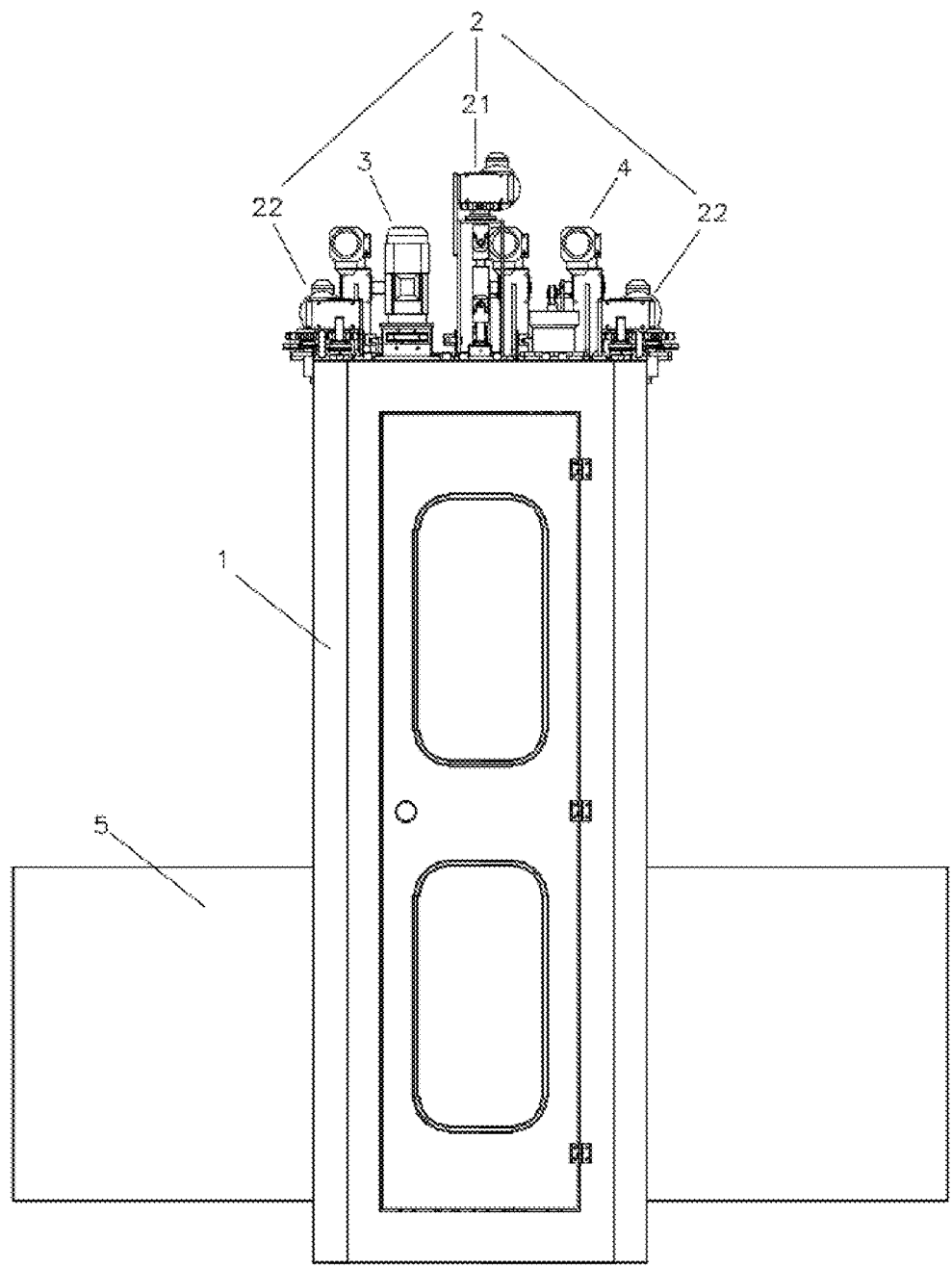
FIG. 1 is the front view of the cleaning device for cleaning a single-curved glass according to some examples of the present disclosure.

FIG. 1 is the front view of the cleaning device according to some examples of the present disclosure. As shown in FIG. 1, the cleaning device may include: a box body 1, a transmission mechanism 2, a cleaning mechanism 3 and a drying mechanism 4.

According to some examples of the present disclosure, each of two sides of the box body 1 may be provided with an opening (not shown in FIG. 1). Through the two openings on the two sides of the box body 1, a single-curved glass 5 may enter and exit the box body 1.

According to some examples of the present disclosure, the transmission mechanism 2 may include a first drive group 21 and two second drive groups 22. The first drive group 21 may be slidably disposed on the box body 1. Each of the two second drive groups 22 may be disposed on the box body 1, especially, on each of two sides of the first drive group 21. By adjusting the position of the first drive group 21, single-curved glasses 5 with different radius of curvature can be delivered into and out from the box body 1.

According to some examples of the present disclosure, the cleaning mechanism 3 and the drying mechanism 4 may be both slidably disposed on the box body 1. By adjusting the positions of the cleaning mechanism 3 and the drying mechanism 4 on the box body 1, single-curved glasses 5 with different radius of curvature can be cleaned by the cleaning mechanism 3 and dried by the drying mechanism 4.

As stated above, in the above cleaning device, the first drive group 21 may be slidably disposed on the box body 1. Each of the two second drive groups 22 may be disposed on the box body 1, especially, on each of two sides of the first drive group 21. Therefore, by adjusting the position of the first drive group 21, single-curved glasses 5 with different radius of curvature may be delivered into and out from the box body 1. Further, by adjusting the positions of the cleaning mechanism 3 and the drying mechanism 4 disposed on the box body 1, single-curved glasses 5 with different radius of curvature can be cleaned and dried.

In examples of the present disclosure, specific structures of the first drive group 21 and the two second drive groups 22 are not strictly limited. For example, conventional driving structures in the art capable of delivering the single-curved glass 5 into and out from the box body 1 can be adopted.

Figure 2:
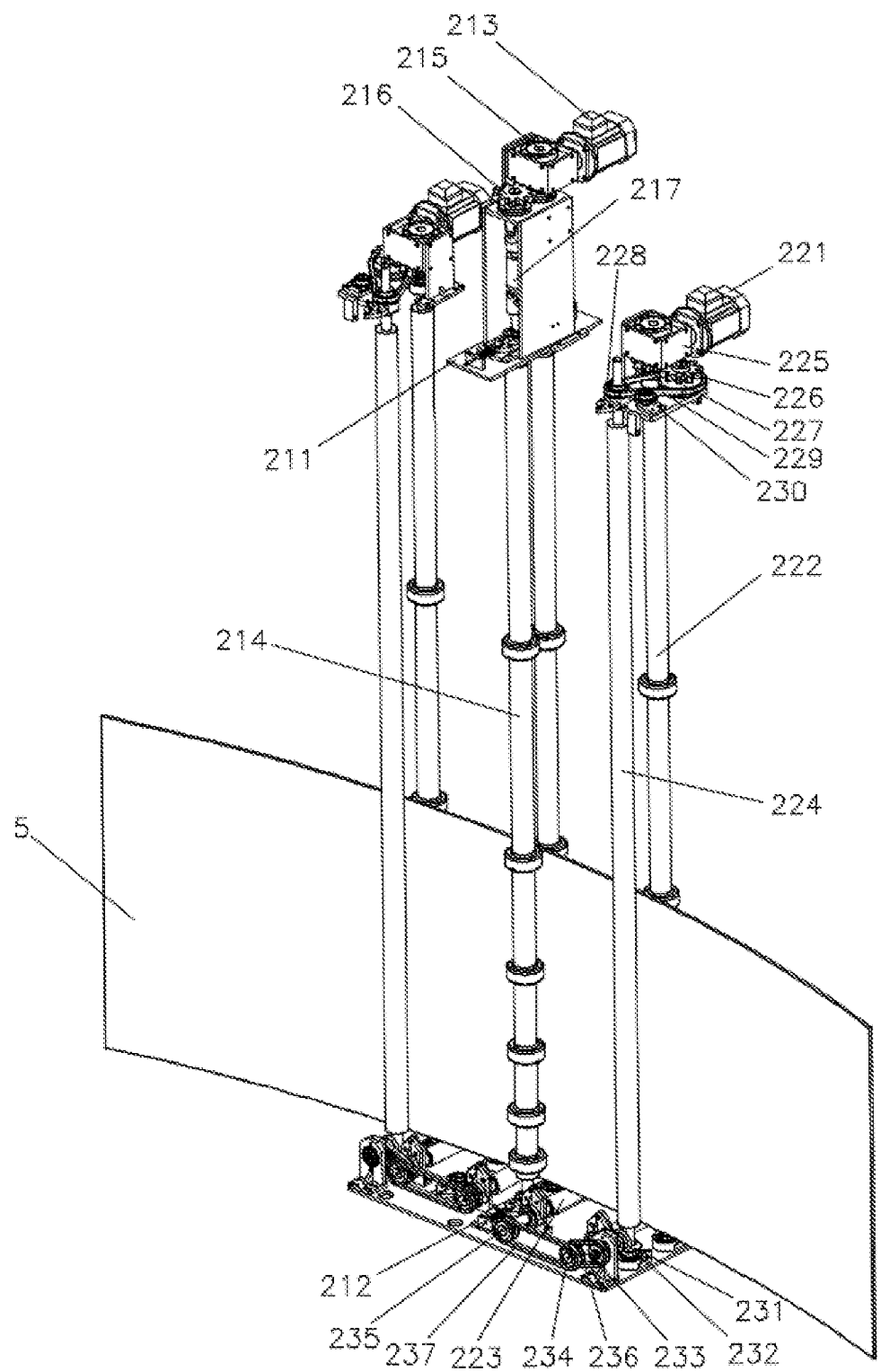
FIG. 2 is a schematic diagram illustrating the structure of the transmission mechanism of the cleaning device according to some examples of the present disclosure.
Figure 3:
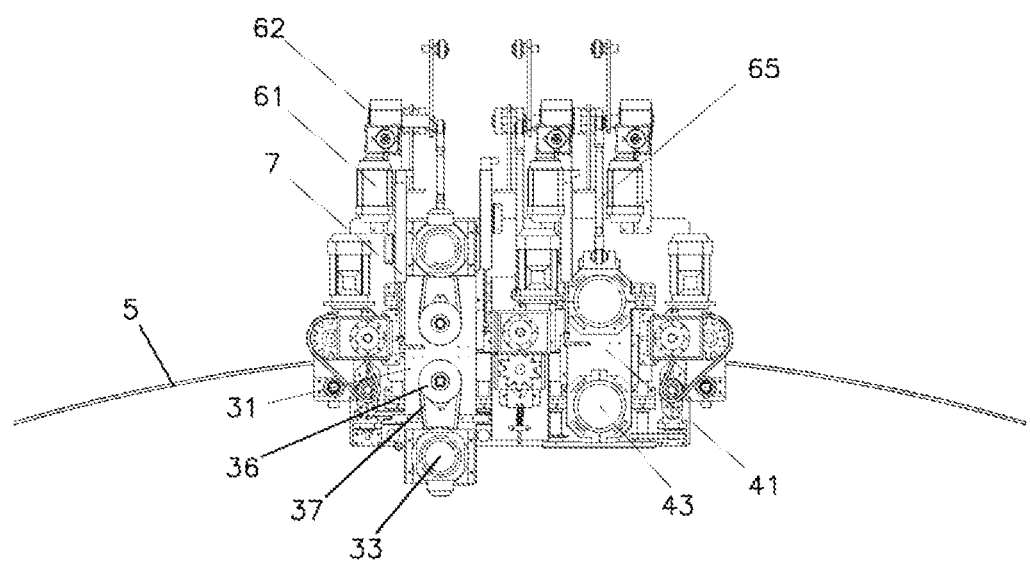
FIG. 3 is the top view of the cleaning device for cleaning a single-curved glass according to some examples of the present disclosure.
Figure 4:
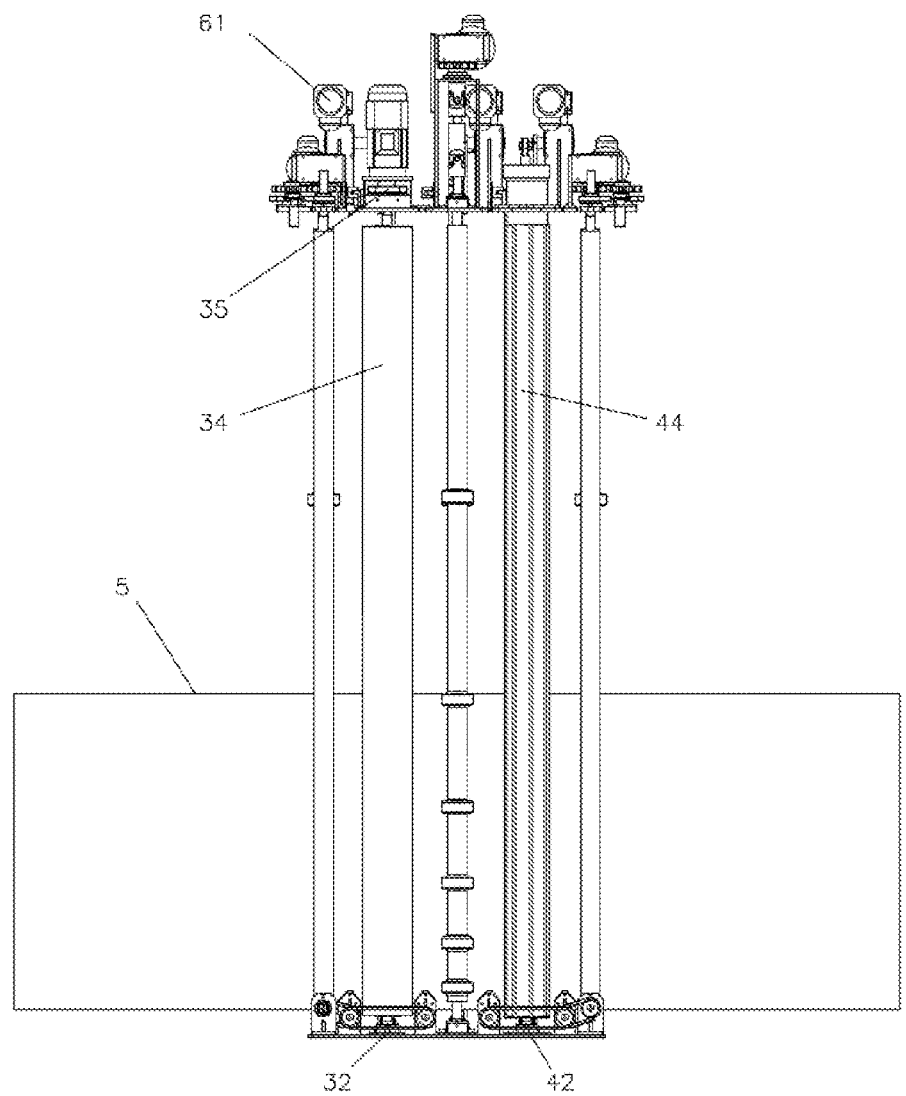
FIG. 4 is a schematic diagram illustrating the internal structure of the box body of the cleaning device according to some examples of the present disclosure.
Figure 5:
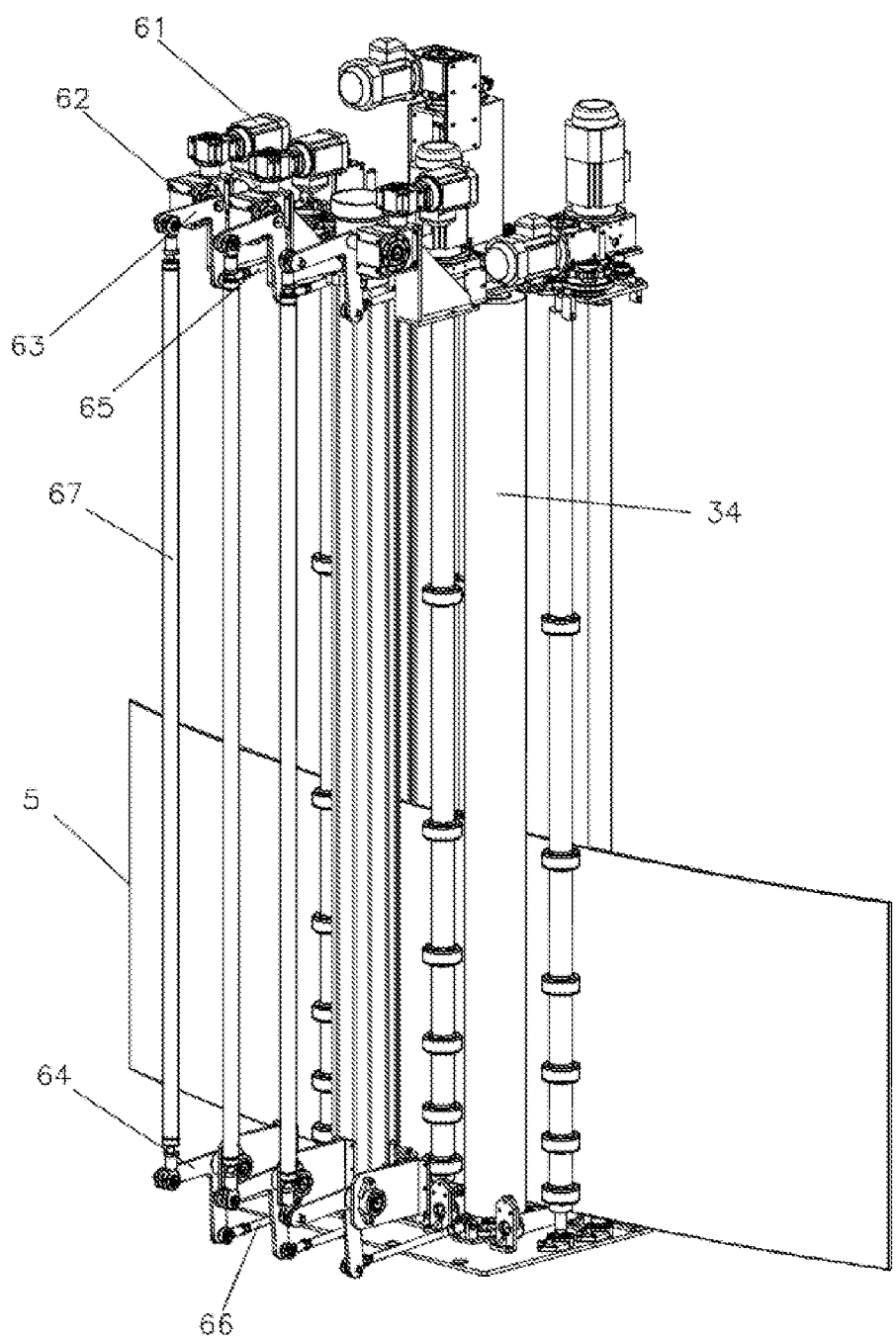
FIG. 5 is a schematic diagram illustrating the overall structure of the cleaning device for cleaning a single-curved glass according to some examples of the present disclosure.
Figure 6:
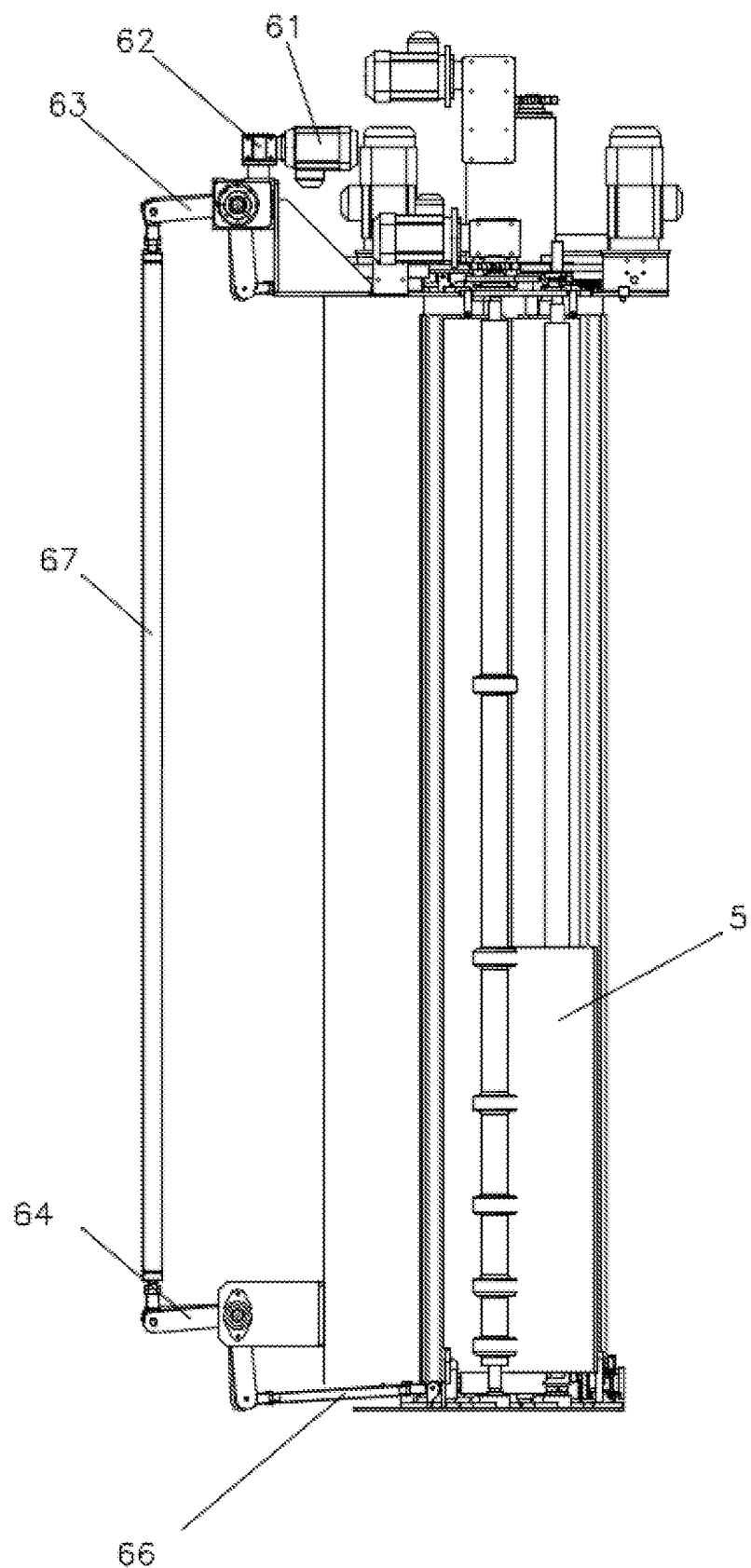
FIG. 6 is the side view of the cleaning device for cleaning a single-curved glass according to some examples of the present disclosure.

Specifically, FIG. 2 is a schematic diagram illustrating the structure of the transmission mechanism 2 according to some examples of the present disclosure. As shown in FIG. 2, in some examples of the present disclosure, the first drive group 21 may include an upper transmission roller slide 211, a lower transmission roller slide 212, a first transmission motor 213; a first drive mechanism and a plurality of first transmission rollers 214.

In these examples, the upper transmission roller slide 211 may be slidably disposed on the top of the box body 1. The lower transmission roller slide 212 may be slidably disposed at the bottom of the box body 1. One end of each of the first transmission rollers 214 may rotatably disposed on the upper transmission roller slide 211; and the other end of each of the first transmission rollers 214 may rotatably disposed on the lower transmission roller slide 212. The first transmission motor 213 may connect to the first transmission rollers 214 through the first drive mechanism. The first transmission motor 213 may be used to drive the first transmission rollers 214 to rotate.

According to some examples of the present disclosure, there may be two first transmission rollers 214. The two first transmission rollers 214 are disposed with an interval, and are to seize and deliver the single-curved glass 5 forward.

According to some examples of the present disclosure, each of the first transmission rollers 214 may be provided with one or more rubber rings. The rubber rings may increase the frictions between each of the first transmission rollers 214 and the single-curved glass 5, and also prevent the first transmission rollers 214 from scratching on the surface of the single-curved glass 5.

According to some examples of the present disclosure, the first drive mechanism may include a first transmission reducer 215; a first drive gear 216; and a universal coupling 217. In these examples, the first transmission motor 213 may connect with the first transmission reducer 215. The first drive gear 216 may be geared with the first transmission reducer 215. The universal coupling 217 may be disposed on the first drive gear 216. The universal coupling 217 and the first transmission reducer 215 may connect with one of the first transmission rollers 214 respectively.

According to some examples of the present disclosure, the second drive group 22 may include a second transmission motor 221, a second transmission roller 222, a first transmission wheel 223, a first drive shaft 224, a second drive mechanism and a third drive mechanism.

In these examples, the second transmission motor 221 may connect with the top end of the second transmission roller 222 and also the top end of the first drive shaft 224 through the second drive mechanism and is used for driving both the second transmission roller 222 and the first drive shaft 224 to rotate. The bottom end of the second transmission roller 222 and the bottom end of the first drive shaft 224 may rotatably disposed on the bottom of the box body 1 respectively. The first drive shaft 224 may connect with and drive the first transmission wheel 223 to rotate through the third drive mechanism.

According to some examples of the present disclosure, through the arrangements of the second transmission roller 222 and the first transmission wheel 223, and under the rotations of the second transmission roller 222 and the first transmission wheel 223, forces can be provided on the side surface and the bottom side of the single-curved glass 5 to drive the single-curved glass 5 to move forward. Furthermore, the transmission stability of the single-curved glass 5 may be also guaranteed.

According to some examples of the present disclosure, the second drive mechanism may include a second transmission reducer 225, a second drive gear 226, a first drive sprocket 227, a second drive sprocket 228 and a first drive chain 229. The second transmission motor 221 may connect with the second transmission reducer 225. The output shaft of the second transmission reducer 225 may connect with the top end of the second transmission roller 222 and drive the second transmission roller 222 to rotate. The output shaft of the second transmission reducer 225 may also be geared with the second drive gear 226 and drive the second drive gear 226 to rotate. The first drive sprocket 227 may connect with the second drive gear 226. The second drive sprocket 228 may be disposed on the top end of the first drive shaft 224 and connect to the first drive sprocket 227 through the first drive chain 229. Through the above connections, the second transmission motor 221 may drive the first drive shaft 224 to rotate. According to some other examples of the present disclosure, the second drive mechanism may further include a tension sprocket 230. The tension sprocket 230 may be disposed on the box body 1 and connect with the first drive chain 229. The tension sprocket 230 is used to tense the first drive chain 229 to improve the drive efficiency between the first drive sprocket 227 and the second drive sprocket 228.

According to some examples of the present disclosure, the third drive mechanism may include a first axial bevel gear 231; a first radial bevel gear 232; a third drive sprocket 233; a fourth drive sprocket 234; a fifth drive sprocket 235; a second drive chain 236; and a third drive chain 237.

In these examples, the axial bevel gear 231 may be disposed at the bottom end of the first drive shaft 224 and be rotatably disposed on the bottom of the box body 1. The third drive sprocket 233 may connect with the first axial bevel gear 231 through the first radial bevel gear 232. Through such connections, the first drive shaft 224 may drive the third drive sprocket 233 to rotate. The third drive sprocket 233 may connect with the fourth drive sprocket 234 through a second drive chain 236. The fourth drive sprocket 234 may connect with the fifth drive sprocket 235 through a third drive chain 237. Moreover, the fourth drive sprocket 234 and the fifth drive sprocket 235 may respectively connect with the first transmission wheel 223 to drive the first transmission wheel 223 to rotate so as to deliver the single-curved glass 5 through the first transmission wheel 223.

According to some examples of the present disclosure, the second transmission roller 222 may be provided with one or more rubber rings. The rubber rings may increase the frictions between the second transmission roller 222 and the single-curved glass 5 and also to avoid the second transmission roller 222 from scratching on the surface of the single-curved glass 5.

As shown in FIG. 3 to FIG. 6, according to some examples of the present disclosure, the cleaning mechanism 3 may include an upper brush slide 31, a lower brush slide 32, a brush motor 33, a fourth drive mechanism and brushes 34. The upper brush slide 31 may be slidably disposed on the top of the box body 1. The lower brush slide 32 may be slidably disposed at the bottom of the box body 1. One end of each of the brushes 34 may be rotatably disposed on the upper brush slide 31 and the other end of each of the brushes 34 may be rotatably disposed on the lower brush slide 32. The brush motor 33 may be disposed on the upper brush slide 31 and connect to the brushes 34 through the fourth drive mechanism. Through these connections, the brush motor 33 may drive the brushes 34 to rotate.

According to some examples of the present disclosure, there would be two brushes 34 arranged side by side. These two brushes 34 may be used to clean the single-curved glass 5 moving in between.

According to some examples of the present disclosure, the fourth drive mechanism may include a first pulley 35, a second pulley 36 and a belt 37. The first pulley 35 may be disposed on the output shaft of the brush motor 33. The second pulley 36 may be disposed on the top of the brushes 34, and connect with the first pulley 35 through the belt 37. Through these connections, the brush motor 33 may drive the brushes 34 to rotate.

According to some examples of the present disclosure, the drying mechanism 4 may include an upper air blade slide 41, a lower air blade slide 42, an upper air duct 43 and air blades 44. The upper air blade slide 41 may be slidably disposed on the top of the box body 1 and the lower air blade slide 42 may be slidably disposed at the bottom of the box body 1. One end of each of the air blades 44 may be disposed on the upper air blade slide 41 and the other end of each of the air blades 44 may be disposed on the lower air blade slide 42. The upper air duct 43 may be disposed on the upper air blade slide 41 and connect with the air blades 44.

According to some examples of the present disclosure, there would be two air blades 44 arranged side by side. These two air blades 44 may be used to dry the single-curved glass 5 moving in between.

According to some examples of the present disclosure, the cleaning device may further include three first position adjusting mechanisms. One first position adjusting mechanism may connect with the first drive group 21 to adjust the horizontal position of the first drive group 21. Another first position adjusting mechanism may connect to the cleaning mechanism 3 to adjust the horizontal position of the cleaning mechanism 3. Moreover, the last first position adjusting mechanism may connect to the drying mechanism 4 to adjust the horizontal position of the drying mechanism 4.

Through the arrangements of the three first position adjusting mechanisms, the positions of the first drive group 21, the cleaning mechanism 3 and the drying mechanism 4 on the box body 1 can be automatically adjusted. Therefore, single-curved glasses 5 with different radius of curvature may be delivered, cleaned and dried automatically. As a result, the cleaning efficiency can be greatly improved as manual operations are no more needed.

According to some examples of the present disclosure, the first position adjusting mechanism may include a crank rotating motor 61, a crank reducer 62, a first crank 63, a second crank 64, a first tie rod 65, a second tie rod 66 and a vertical tie rod 67.

In these examples, the crank rotating motor 61 may connect with the crank reducer 62. The crank reducer 62 may connect with the middle point of the first crank 63. Through such connections, the crank rotating motor 61 may drive the first crank 63 to rotate. One end of the first crank 63 may be hinged with the top end of the vertical tie rod 67, and the other end may be hinged with one end of the first tie rod 65. The other end of the first tie rod 65 may connect with the upper transmission roller slide 211, the upper brush slide 31 or the upper air blade slide 41. The bottom end of the vertical tie rod 67 may be hinged with one end of the second crank 64. The middle point of the second crank may be hinged with the bottom of the box body 1. The other end of the second crank 64 may be hinged with one end of the second tie rod 66. The other end of the second tie rod 66 may connect with the lower transmission roller slide 212, the lower brush slide 32 or the lower air blade slide 42. Through such connections, the first position adjusting mechanism can adjust horizontal positions of the first drive group 21, the cleaning mechanism 3 and the drying mechanism 4.

According to some examples of the present disclosure, the cleaning device may further include a linear potentiometer 7. The linear potentiometers 7 may be disposed on the top of the box body 1. In some examples, there would be three linear potentiometers 7. One linear potentiometer 7 may connect with the upper transmission roller slide 211 to accurately adjust the position of the upper transmission roller slide 211. Another linear potentiometer 7 may connect with the upper brush slide 31 to accurately adjust the position of the upper brush slide 31. The last linear potentiometer 7 may connect with the upper air blade slide 41 to accurately adjust the position of the upper air blade slide 41.

Figure 7:
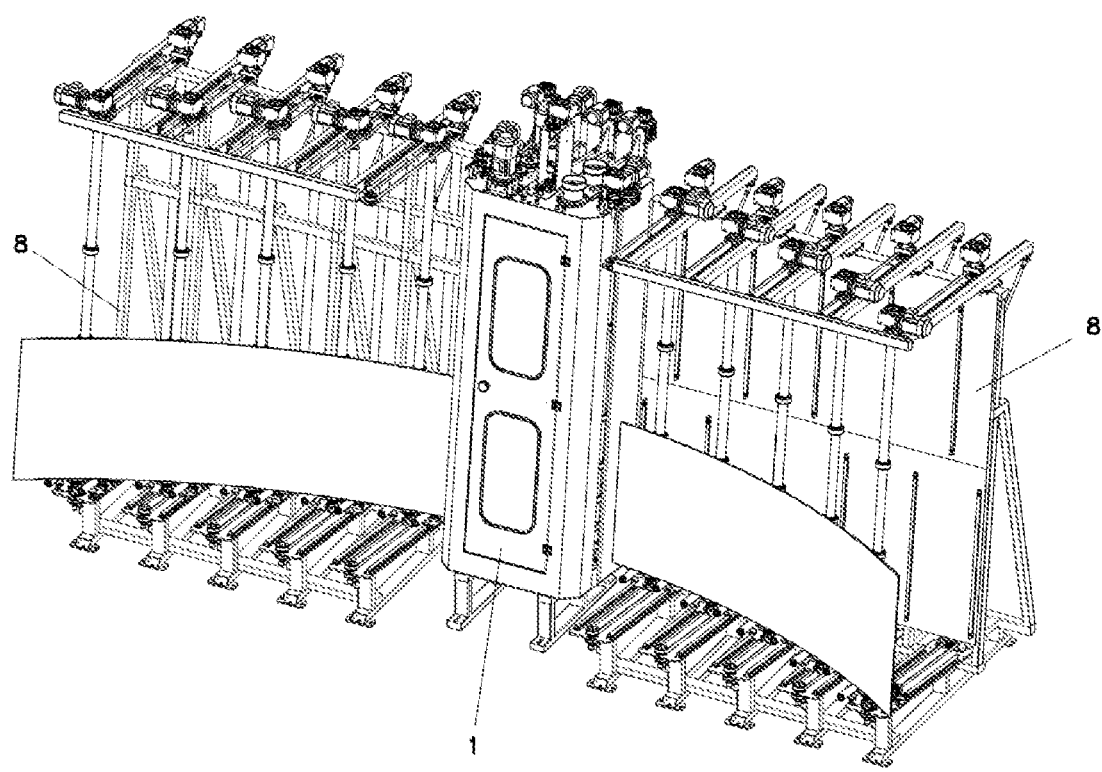
FIG. 7 is a schematic diagram illustrating the structure of the cleaning device for cleaning a single-curved glass with glass delivery mechanisms according to some examples of the present disclosure.
Figure 8:
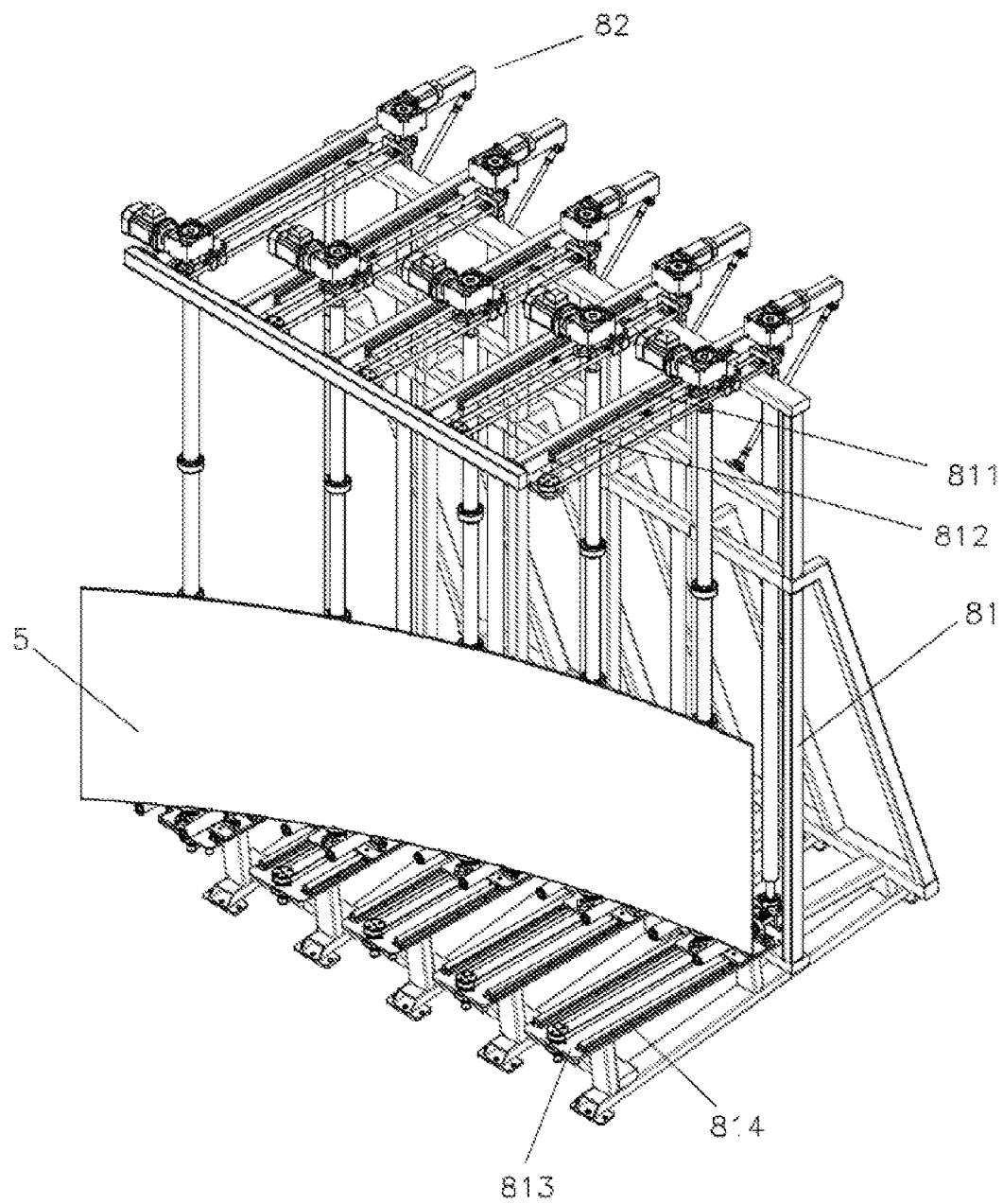
FIG. 8 is a schematic diagram illustrating the structure of the glass delivery mechanism according to some examples of the present disclosure.

As shown in FIG. 7 and FIG. 8, the cleaning device may further include at least one glass transmission mechanism 8. According to some examples of the present disclosure, two glass transmission mechanisms 8 may be disposed on both two sides of the box body 1 respectively. Wherein, one is used for delivering the single-curved glass 5 to be cleaned into the box body 1; and the other is used for delivering the single-curved glass 5 out of the box body 1 after it is cleaned by the cleaning device. Through the arrangements of the glass transmission mechanisms 8, the single-curved glass 5 may be delivered automatically, therefore, manual operations are no longer needed.

According to some examples of the present application, the glass transmission mechanism 8 may include a frame 81 and a third drive group 82. In these examples, the frame 81 may include an upper slide support 811, an upper slide 812 disposed on the upper slide support 811, a lower slide support 813 and a lower slide 814 disposed on the lower slide support 813. There would be a plurality of the third drive groups 82 which are disposed at intervals. Each third drive group 82 may be slidably disposed on the upper slide 812 and on the lower slide 814.

Figure 9:
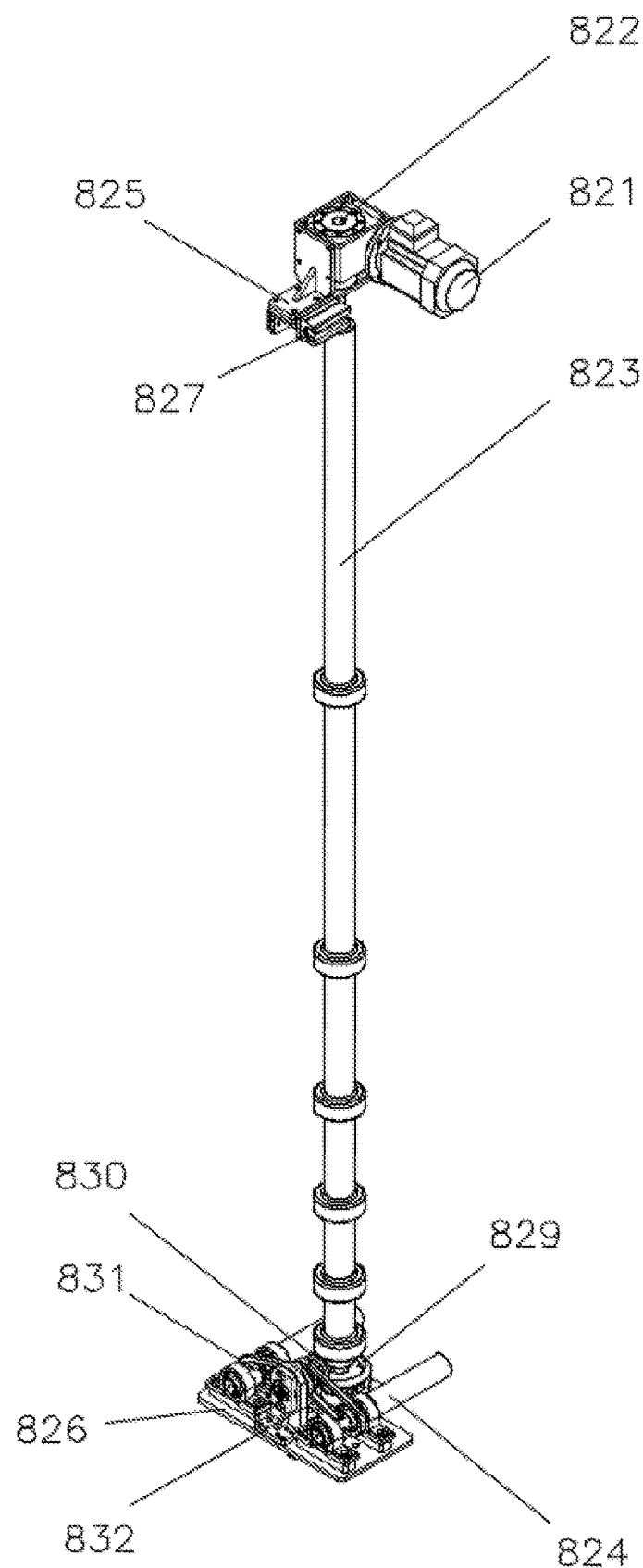
FIG. 9 is a first schematic diagram illustrating the structure of the third drive group of the cleaning device according to some examples of the present disclosure.
Figure 10:
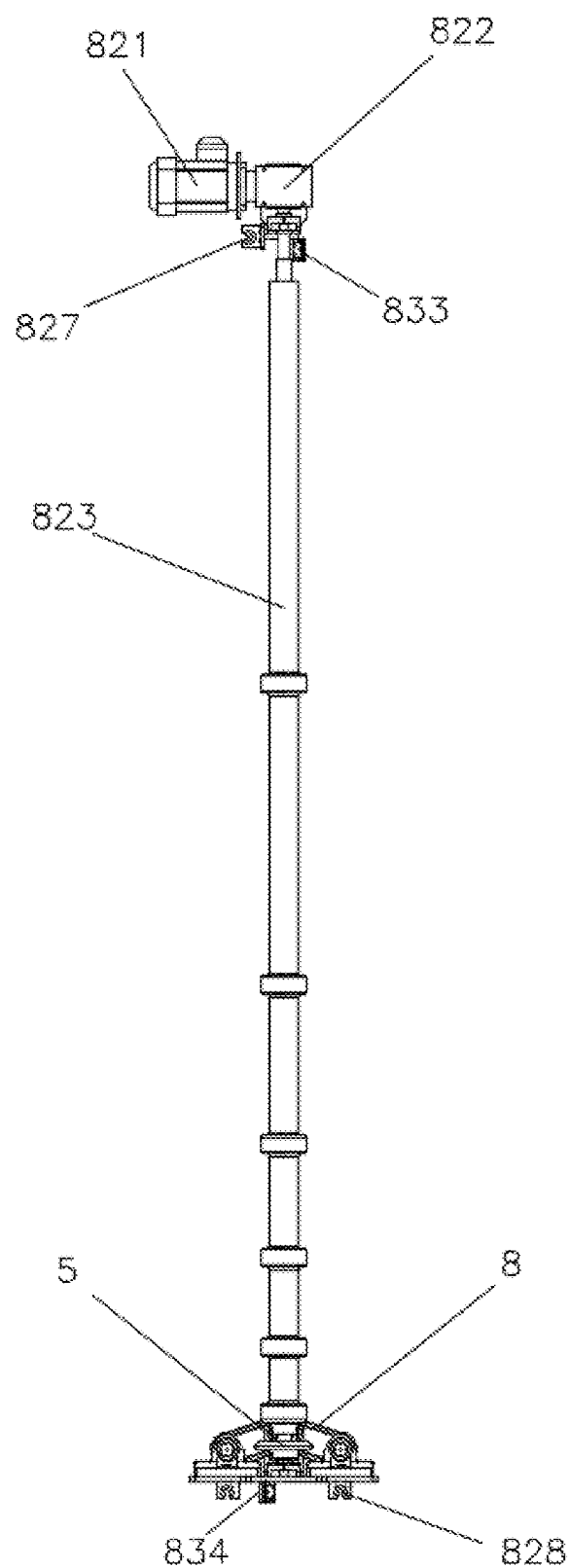
FIG. 10 is a second schematic diagram illustrating the structure of the third drive group of the cleaning device according to some examples of the present disclosure.

As shown in FIG. 9 and FIG. 10, the third drive group 82 may include a third transmission motor 821, a third transmission reducer 822, a third transmission roller 823, a fifth drive mechanism, a second transmission wheel 824, an upper slider 825 and a lower slider 826. According to some examples of the present disclosure, the third transmission motor 821 may connect with the third transmission reducer 822. The third transmission motor 822 may be disposed on the upper slider 825. The output shaft of the third transmission motor 821 may connect to the top end of the third transmission roller 823 thus can drive the third transmission roller 823 to rotate.

In these examples, on the upper slider 825, a first sliding slot 827 corresponding to the upper slide 812 may be disposed. The bottom of the third transmission roller 823 may be rotatably disposed on the lower slider 826. The third transmission roller 823 may connect with the second transmission wheel 824 through a fifth drive mechanism, to drive the second transmission wheel 824 to rotate. Moreover, on the lower slider 826, a second sliding slot 828 corresponding to the lower slide 814 may be disposed.

According to some examples of the present disclosure, the fifth drive mechanism may include a second axial bevel gear 829, a second radial bevel gear 830, a sixth drive sprocket 831 and a fourth drive chain 832. In these examples, the second axial bevel gear 829 is disposed on the bottom of the third transmission roller 823 and is rotatably disposed on the lower slider 826. The second radial bevel gear 830 is geared with the second axial bevel gear 829 and is rotatably disposed on the lower slider 826. There would be two sixth drive sprockets 831. Each sixth drive sprocket 831 may connect with the second radial bevel gear 830 through the fourth drive chain 832. Further, the sixth drive sprockets 831 may be disposed on the second transmission wheel 824. Through the above connections, the rotation of the third transmission roller 823 would drive the second transmission wheel 824 to rotate. Therefore, the single-curved glass 5 may be delivered automatically.

According to some examples of the present disclosure, the third transmission roller 823 may be provided with one or more rubber rings. Through the arrangements of the one or more rubber rings, the frictions between the third transmission roller 823 and the single-curved glass 5 may be increased and also the rubber rings may be used to avoid the third transmission roller 823 from scratching the surface of the single-curved glass 5.

Figure 11:
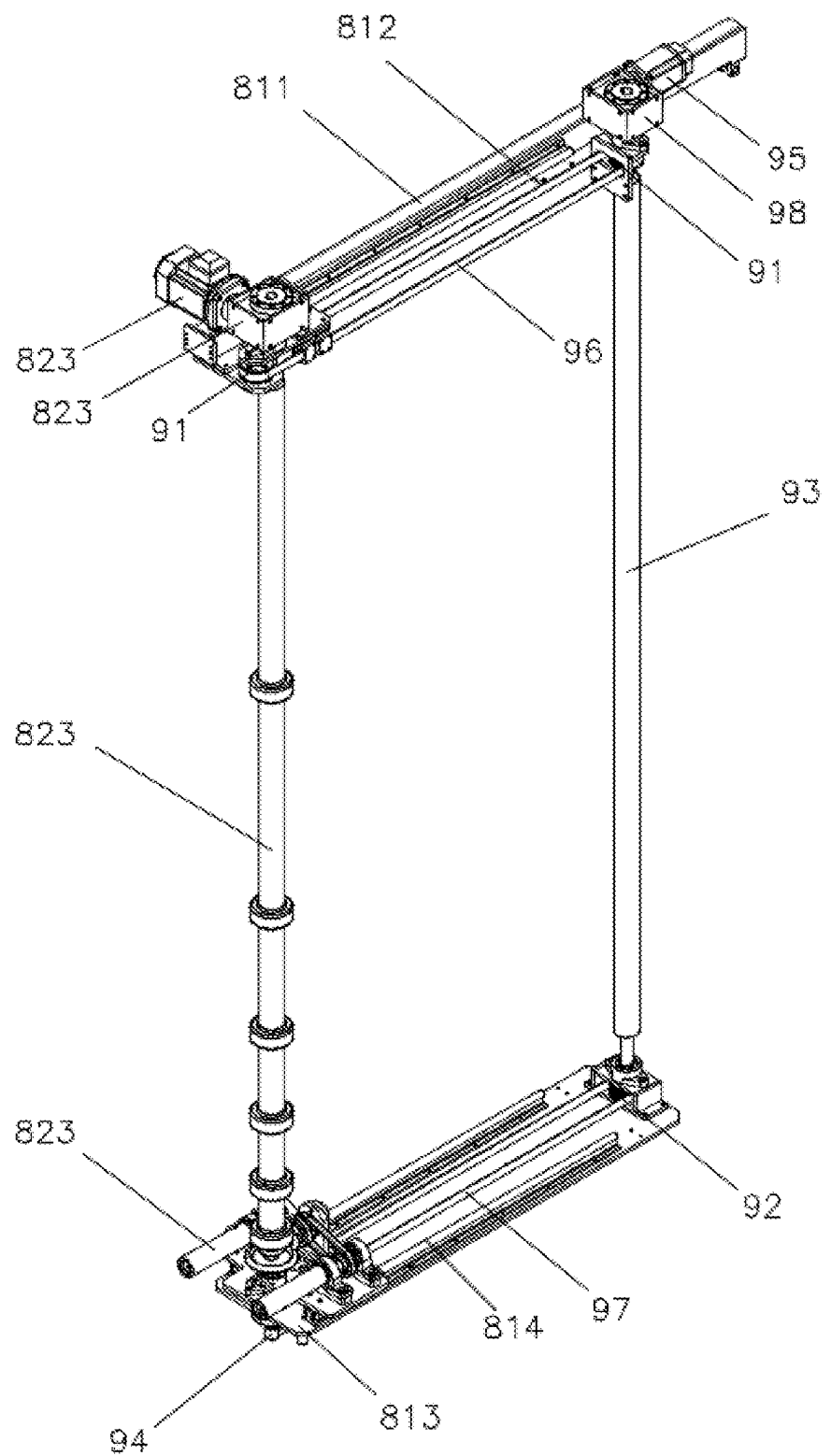
FIG. 11 is a first schematic diagram illustrating the structure of the third drive group with a second adjusting mechanism of the cleaning device according to some examples of the present disclosure.
Figure 12:
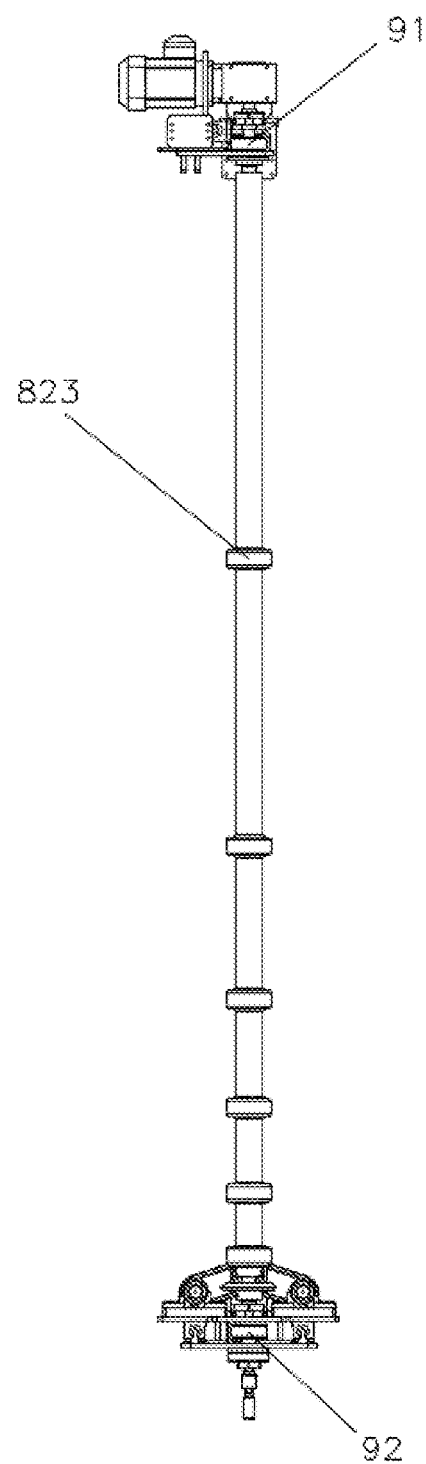
FIG. 12 is a second schematic diagram illustrating the structure of the third drive group with a second adjusting mechanism of the cleaning device according to some examples of the present disclosure.

According to some examples of the present disclosure, the glass delivery mechanism 8 may further include a second position adjusting mechanism. As shown in FIG. 11 and FIG. 12, the second position adjusting mechanism may include two upper synchronizing pulleys 91, two lower synchronizing pulleys 92, a second drive shaft 93, a handle 94 and a drive motor 95.

The two upper synchronizing pulleys 91 may be rotatably disposed on the two ends of the upper slide support 811 respectively. The two upper synchronizing pulleys 91 may connect with each other through a first synchronizing belt 96. The first synchronizing belt 96 may connect with the upper slider 825 through a first stopper 833. The two lower synchronizing pulleys 92 may be rotatably disposed on the two ends of the lower slide support 813 respectively. The two lower synchronizing pulleys 92 may connect with each other through a second synchronizing belt 97. The second synchronizing belt 97 may connect with the lower slider 825 through a second stopper 834.

One end of the second drive shaft 93 may be disposed on an upper synchronizing pulley 91 and the other end of the second drive shaft 93 may be disposed on a lower synchronizing pulley 92 on the same side with the upper synchronizing pulley 91. The handle 94 may connect with a lower synchronizing pulley 92. The drive motor 95 may connect with the upper synchronizing pulleys 91 through a drive reducer 98. The handle 94 may drive the lower synchronizing pulleys 92 to rotate, which may further drive the second synchronizing belt 97 to rotate. The drive motor 95 may drive the upper synchronizing pulleys 91 to rotate, which may further drive the first synchronizing belt 96 to rotate. Therefore, the upper slider 825 and the lower slider 826 may move synchronously.

Figure 13:
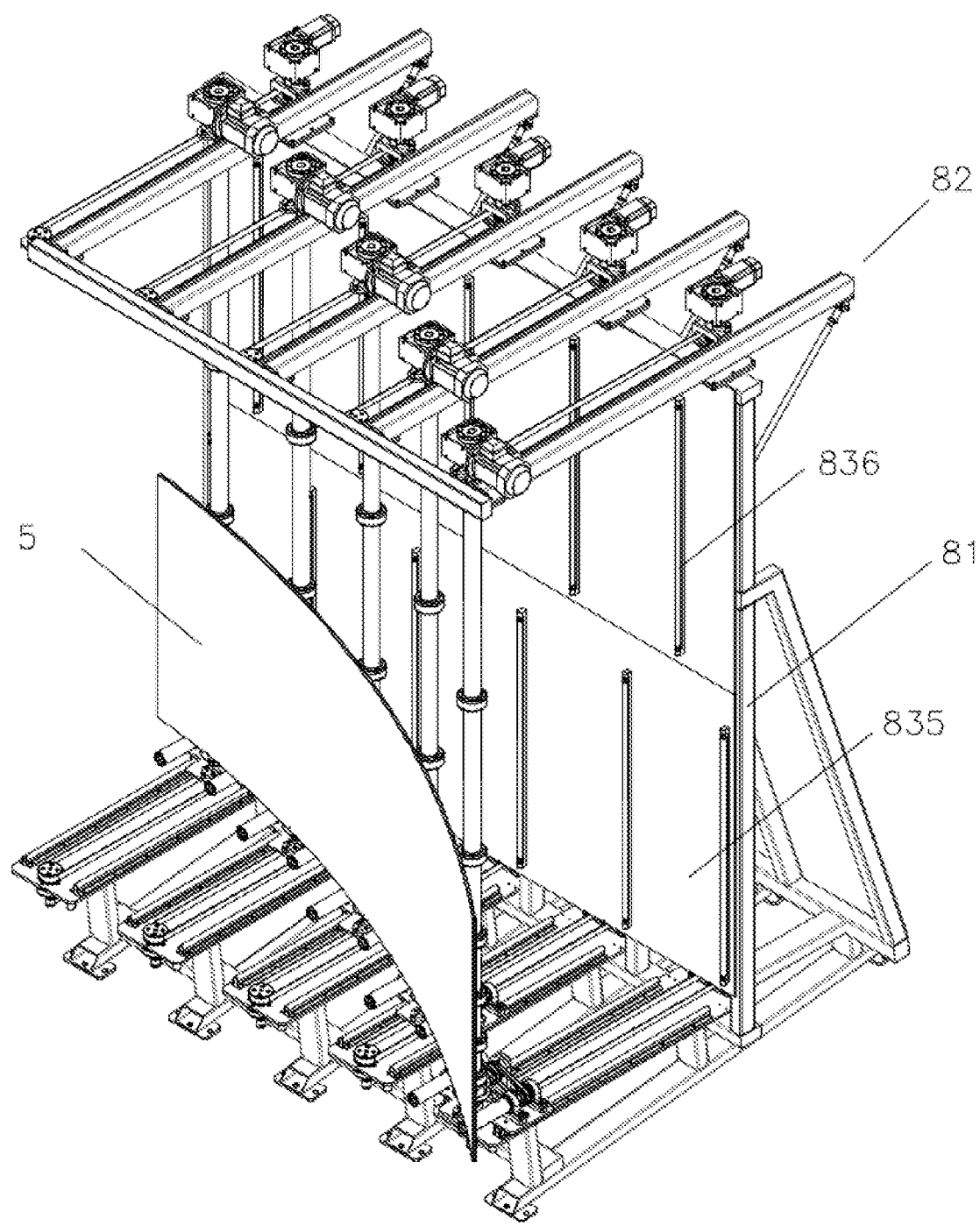
FIG. 13 is a schematic diagram illustrating the structure of the glass delivery mechanism with an inspection backplane and an inspection lamp according to some examples of the present disclosure.

As shown in FIG. 13, according to some examples of the present disclosure, the glass delivery mechanism 8 for delivering a cleaned single-curved glass 5 may further include an inspection backplane 835 and an inspection lamp 836. The inspection backplane 835 may be disposed on the frame 81 and positioned behind the back surface of the single-curved glass 5. The inspection lamp 836 may be disposed on the inspection backplane 835. Through the arrangements of the inspection backplane 835 and the inspection lamp 836, the cleaned single-curved glass 5 can be inspected conveniently. According to some other examples of the present disclosure, the color of the inspection backplane 835 may be black. In this case, the cleaned single-curved glass 5 can be better inspected.

In the cleaning device disclosed, the first drive group 21 may be slidably disposed on the box body 1, the second drive groups 22 may be disposed on the box body 1 and especially, on two sides of the first drive group 21. By adjusting the position of the first drive group 21, the single-curved glass 5 with different radius of curvature can be delivered into and out from the box body 1.

Further, by adjusting the positions of the cleaning mechanism 3 and the drying mechanism 4 on the box body 1, the single-curved glass 5 with different radius of curvature can be cleaned and dried.

It can be seen that, the cleaning device disclosed is simple in structure, which can replace manual work and clean and dry the single-curved glass 5 rapidly. The cleaning efficiency of the cleaning device is high. Moreover, it puts no limitations on the size of the single-curved glass 5 to be cleaned. Therefore, it can be widely used in actual situations.

Moreover, through the arrangements of the second transmission roller 222 and the first transmission wheel 223 of the second drive group 22, the second drive group 22 can provide a forward forces on the side surface and the bottom surface of a single-curved glass 5 respectively under the rotation of the second transmission roller 222 and the first transmission wheel 223. The forces can drive the single-curved glass 5 to move forward. Moreover, such arrangements may guarantee the stability of the single-curved glass 5 while moving.

In addition, through the arrangements of line potentiometers 7 in the cleaning device provided by examples of the present disclosure, the positions of the upper transmission roller slide 211, the upper brush slide 31 and the upper air blade slide 41 can be adjusted more accurately so as to clean single-curved glasses with different radius of curvature better.

Based on the cleaning device disclosed, the process of cleaning a single-curved glass 5 may be described as follows.

Firstly, two glass delivery mechanisms 8 are disposed at the inlet and the outlet of the box body 1 respectively.

Moreover, the positions of the first drive group, the third drive group 82, the cleaning mechanism and the drying mechanism are adjusted according to the radius of curvature of the single-curved glass 5 to be cleaned.

Then, the single-curved glass 5 to be cleaned may enter the box body 1 through the glass delivery mechanism 8 disposed at the inlet of the box body 1. Specifically, the side surface of the single-curved glass 5 should be attached to the third transmission roller 823, the bottom of the single-curved glass 5 should be arranged on the second transmission wheel 824. Therefore, the single-curved glass 5 may be delivered into the box body 1 under the rotations of the third transmission roller 823 and the second transmission wheel 824.

In the box body 1, the side surface of the single-curved glass 5 should be attached to the second transmission roller 222 on the inlet side of the box body 1, and the bottom of the single-curved glass 5 should be positioned on the first transmission wheel 223. Therefore, the single-curved glass 5 may be driven by the second transmission roller 222 and the first transmission wheel 223 to move forward between the two brushes 34. The two brushes 34 may clean the two sides of the single-curved glass 5.

The single-curved glass 5 cleaned by the brush 34 may continuously move forward in the box body 1 under the actions of the two first transmission rollers 214. Then, the single-curved glass 5 may be delivered through a gap between the two air blades 44. The two air blades 44 may dry the single-curved glass 5 passing by.

The dried single-curved glass 5 may continuously move forward and then be attached to a second transmission roller 222 on the outlet side of the box body 1. The bottom of the single-curved glass 5 may be positioned on the first transmission wheel 223, and the single-curved glass 5 may be output by the box body 1 through the outlet of the box body 1 under the driving of the second transmission roller 222 and the first transmission wheel 223.

At last, the single-curved glass 5 may be output through the glass delivery mechanism 8 at the outlet of the box body 1. Specifically, the side surface of the single-curved glass 5 should be attached to the third transmission roller 823, and the bottom of the single-curved glass 5 should be placed on the second transmission wheel 824. Thus, the single-curved glass 5 may be output under the rotations of the third transmission roller 823 and the second transmission wheel 824. Moreover, in the output process, the cleaned and dried single-curved glass 5 should be inspected through the light from the inspection lamp 836 on the inspection backplane 835.

One of ordinary skill in the art will appreciate that: the discussion of any of the above examples is merely exemplary and is not intended to imply that the scope of the disclosure, including the claims, is limited to these examples. The above examples or technical features in different examples may also be combined under the idea of the present disclosure, the steps may be implemented in any order, and there are many other variations of different aspects of the present disclosure as described above, which are not provided in detail for the sake of brevity.

While the application has been described in conjunction with specific examples thereof, many alternatives, modifications and variations thereof will be apparent to those skilled in the art in light of the foregoing description.

The present examples are intended to embrace all such alternatives, modifications and variances that fall within the broad scope of the appended claims. Therefore, it is intended that any omissions, modifications, equivalents, improvements and the like be included within the spirit and scope of the present disclosure.

What is claimed is:

1. A cleaning device for cleaning a single-curved glass, comprising: a box body, a transmission mechanism, a cleaning mechanism and a drying mechanism; wherein,
   the box body comprises two openings on two side of the box body; wherein, the single-curved glass enters the box body through one opening and exits the box body through the other opening;
   the transmission mechanism comprises a first drive group and two second drive groups; wherein, the first drive group is slidably disposed on the box body; the second drive groups are disposed on the box body and on two sides of the first drive group; the second drive groups are to deliver the single-curved glass in the box body;
   the cleaning mechanism is slidably disposed on the box body to clean the single-curved glass; and
   the drying mechanism is slidably disposed on the box body and to dry the single-curved glass.

2. The cleaning device of claim 1, wherein the first drive group comprises an upper transmission roller slide, a lower transmission roller slide, a first transmission motor, a first drive mechanism and two first transmission rollers; wherein,
   the upper transmission roller slide is slidably disposed on a top of the box body;

the lower transmission roller slide is slidably disposed at a bottom of the box body;

one end of each of the two first transmission rollers is rotatably disposed on the upper transmission roller slide;

the other end of each of the two first transmission rollers is rotatably disposed on the lower transmission roller slide;

the first transmission motor connects with the two first transmission rollers through the first drive mechanism and to drive the two first transmission rollers to rotate; and the two first transmission rollers are disposed with an interval to seize the single-curved glass to move forward.

3. The cleaning device of claim 2, wherein the first drive mechanism comprises: a first transmission reducer, a first drive gear and a universal coupling; wherein, the first transmission motor connects with the first transmission reducer;

the first drive gear is geared with the first transmission reducer;

the universal coupling is disposed on the first drive gear; and both the universal coupling and the first transmission reducer connect with the first transmission roller.

4. The cleaning device of claim 1, wherein the second drive group comprise: a second transmission motor, a second transmission roller, a first transmission wheel, a first drive shaft, a second drive mechanism and a third drive mechanism; wherein, the second transmission motor connects with a top end of the second transmission roller and a top end of the first drive shaft through the second drive mechanism, to drive the second transmission roller and the first drive shaft to rotate;

a bottom end of the second transmission roller is rotatably disposed at a bottom of the box body;

a bottom end of the first drive shaft is rotatably disposed at the bottom of the box body;

the first transmission wheel is horizontally and rotatably disposed at the bottom of the box body; and the first drive shaft connects with the first transmission wheel through the third drive mechanism to drive the first transmission wheel to rotate which is to deliver the single-curved glass in the box body.

5. The cleaning device of claim 4, wherein the second drive mechanism comprises: a second transmission reducer, a second drive gear, a first drive sprocket, a second drive sprocket and a first drive chain; wherein, the second transmission motor connects with the second transmission reducer;

an output shaft of the second transmission reducer connects with the top end of the second transmission roller;

the second drive gear is geared with the output shaft of the second transmission reducer;

the first drive sprocket is disposed on the second drive gear; and the second drive sprocket is disposed on the top end of the first drive shaft and connects with the first drive sprocket through the first drive chain.

6. The cleaning device of claim 5, wherein the second drive mechanism further comprises: a tension sprocket; wherein, the tension sprocket is disposed on the box body and connects with the first drive chain, to tense the first drive chain.

7. The cleaning device of claim 4, wherein the third drive mechanism comprises: a first axial bevel gear, a first radial bevel gear, a third drive sprocket, a fourth drive sprocket, a fifth drive sprocket, a second drive chain and a third drive chain; wherein, the first axial bevel gear connects to the bottom end of the first drive shaft and is rotatably disposed at the bottom of the box body;

the first axial bevel gear is geared with the third drive sprocket through the first radial bevel gear and is to drive the third drive sprocket to rotate;

the third drive sprocket connects with the fourth drive sprocket through the second drive chain;

the fourth drive sprocket connects with the fifth drive sprocket through the third drive chain; and both the fourth drive sprocket and the fifth drive sprocket connect with the first transmission wheel.

8. The cleaning device of claim 1, wherein the cleaning mechanism comprises: an upper brush slide, a lower brush slide, a brush motor, a fourth drive mechanism and two brushes;

the upper brush slide is slidably disposed on a top of the box body;

the lower brush slide is slidably disposed at a bottom of the box body;

one end of each brush is rotatably disposed on the upper brush slide;

the other end of each brush is rotatably disposed on the lower brush slide;

the brush motor is disposed on the upper brush slide and connects to the two brushes through the fourth drive mechanism;

the two brushes are disposed with an interval and are to clean the single-curved glass moving in between.

9. The cleaning device of claim 8, wherein, the fourth drive mechanism comprises: a first pulley, a second pulley and a belt; wherein, the first pulley is disposed on an output shaft of the brush motor;

the second pulley is disposed on a top of the two brushes and connects with the first pulley through the belt.

10. The cleaning device of claim 1, wherein, the drying mechanism comprises: an upper air blade slide, a lower air blade slide, an upper air duct and two air blades; wherein the upper air blade slide is slidably disposed on a top of the box body;

the lower air blade slide is slidably disposed at a bottom of the box body;

one end of each air blade is disposed on the upper air blade slide;

the other end of each air blade is disposed on the lower air blade slide;

the upper air duct is disposed on the upper air blade slide and connects to the two air blades; and the two air blades are disposed with an interval and are to dry the single-curved glass moving in between.

11. The cleaning device of claim 1, further comprising: three first position adjusting mechanisms; wherein, one first position adjusting mechanism connects to the first drive group and is to adjust a horizontal position of the first drive group;

another first position adjusting mechanism connects to the cleaning mechanism and is to adjust a horizontal position of the cleaning mechanism; and the last first position adjusting mechanism connects to the drying mechanism and is to adjust a horizontal position of the drying mechanism.

12. The cleaning device of claim 11, wherein, the first position adjusting mechanism comprises: a crank rotating motor, a crank reducer, a first crank, a second crank, a first tie rod, a second tie rod and a vertical tie rod; wherein,
- the crank rotating motor connects with the crank reducer;
- the crank reducer connects to a middle point of the first crank and is to drive the first crank to rotate;
- one end of the first crank is hinged with a top end of the vertical tie rod;
- the other end of the first crank is hinged with one end of the first tie rod;
- the other end of the first tie rod connects with an upper transmission roller slide, an upper brush slide or an upper air blade slide;
- a bottom end of the vertical tie rod is hinged with one end of the second crank;
- the middle point of the second crank is hinged with a bottom of the box body;
- the other end of the second crank is hinged with one end of the second tie rod; and
- the other end of the second tie rod connects with a lower transmission roller slide, a lower brush slide or a lower air blade slide.

13. The cleaning device of claim 1, further comprising: two glass delivery mechanisms; wherein,
- each of the two glass delivery mechanisms is disposed on one side of the box body;
- one glass delivery mechanism is to deliver the single-curved glass to be cleaned; and
- the other glass delivery mechanism is to deliver the single-curved glass cleaned.

14. The cleaning device of claim 13, wherein, each of the two glass delivery mechanisms comprises: a frame and a plurality of third drive groups; wherein,
- the frame comprises an upper slide support, an upper slide disposed on the upper slide support, a lower slide support, a lower slide disposed on the lower slide support;
- the plurality of third drive groups are disposed at intervals; and
- each of the plurality of third drive groups is disposed on the upper slide and the lower slide.

15. The cleaning device of claim 14, wherein, the plurality of third drive groups comprises: a third transmission motor, a third transmission reducer, a third transmission roller, a fifth drive mechanism, a second transmission wheel, an upper slider and a lower slider; wherein,
- the third transmission motor connects with the third transmission reducer;
- the third transmission motor is disposed on the upper slider;
- an output shaft of the third transmission motor connects to a top end of the third transmission roller;
- a first sliding slot corresponding to the upper slide is disposed on the upper slider;
- a bottom of the third transmission roller is rotatably disposed on the lower slider;
- the third transmission roller connects with the second transmission wheel through the fifth drive mechanism, to drive the second transmission wheel to rotate; and
- a second sliding slot corresponding to the lower slide is disposed on the lower slider.

16. The cleaning device of claim 15, wherein, the fifth drive mechanism comprises: a second axial bevel gear, a second radial bevel gear, a sixth drive sprocket and a fourth drive chain; wherein,
- the second axial bevel gear is disposed at the bottom of the third transmission roller and is rotatably disposed on the lower slider;
- the second radial bevel gear is geared with the second axial bevel gear and is rotatably disposed on the lower slider;
- the sixth drive sprocket connects with the second radial bevel gear through the fourth drive chain; and
- the sixth drive sprocket is disposed on the second transmission wheel to deliver the single-curved glass.

17. The cleaning device of claim 14, wherein the glass delivery mechanisms further comprise a second position adjusting mechanism; wherein,
- the second position adjusting mechanism comprises two upper synchronizing pulleys, two lower synchronizing pulleys, a second drive shaft and a driver;
- the two upper synchronizing pulleys are rotatably disposed on two ends of the upper slide support respectively;
- the two upper synchronizing pulleys connect with each other through a first synchronizing belt;
- the first synchronizing belt connects with the upper slider through a first stopper;
- the two lower synchronizing pulleys are rotatably disposed on two ends of the lower slide support respectively;
- the two lower synchronizing pulleys connect with each other through a second synchronizing belt;
- the second synchronizing belt connects with the lower slider through a second stopper;
- one end of the second drive shaft is disposed on one upper synchronizing pulley and the other end of the second drive shaft is disposed on one lower synchronizing pulley on the same side of the upper synchronizing pulley;
- the driver connects with the upper synchronizing pulleys and/or the lower synchronizing pulleys and is to drive the upper synchronizing pulleys and/or the lower synchronizing pulleys to rotate.

18. The cleaning device of claim 17, wherein, the driver comprises a handle and/or a drive motor.

19. The cleaning device of claim 14, wherein, the glass delivery mechanism to deliver the single-curved glass cleaned further comprises: an inspection backplane and an inspection lamp; wherein,
- the inspection backplane is disposed on the frame facing a back surface of the single-curved glass; and
- the inspection lamp is disposed on the inspection backplane.

20. The cleaning device of claim 2, further comprising: a linear potentiometer disposed on the top of the box body; wherein, the linear potentiometer connects with the upper transmission roller slide to adjust a position of the upper transmission roller slide.

* * * * *